Jan. 22, 1929.　　　　　　　　　　　　　　　　1,699,520
F. B. BURKHARDT
ENSILAGE MACHINE
Filed July 6, 1925　　　　2 Sheets-Sheet 1
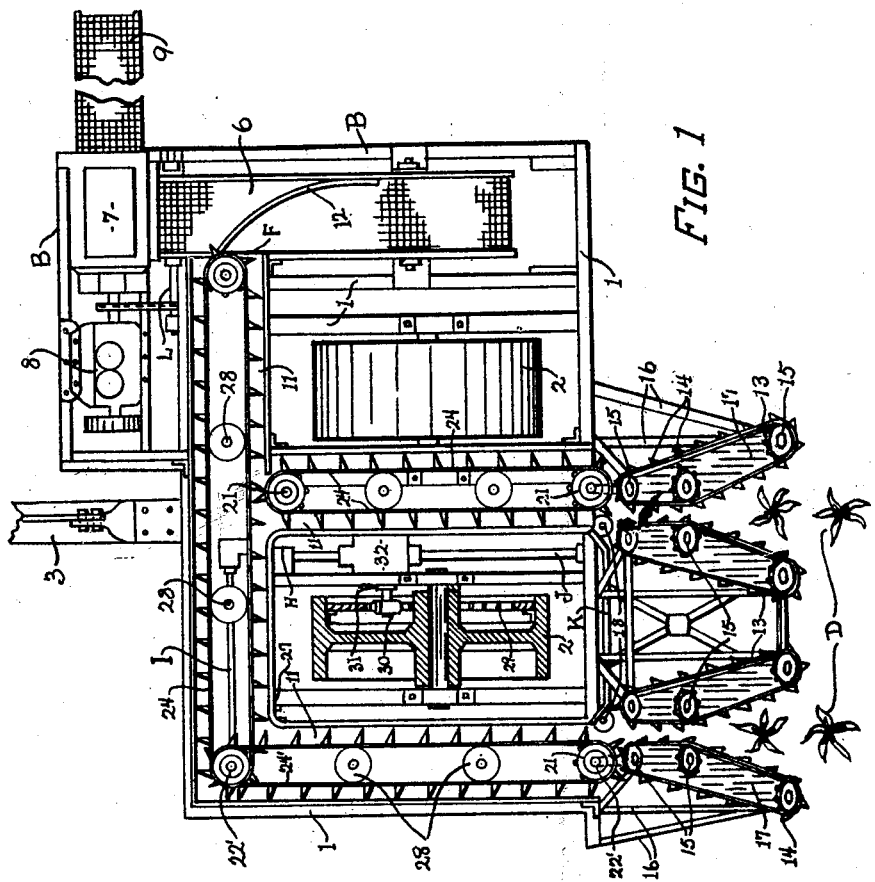
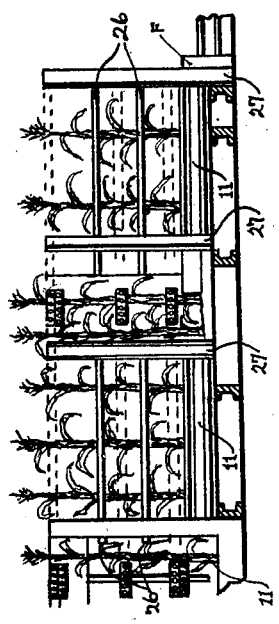
INVENTOR.
FLOYD B. BURKHARDT
BY
ATTORNEY.

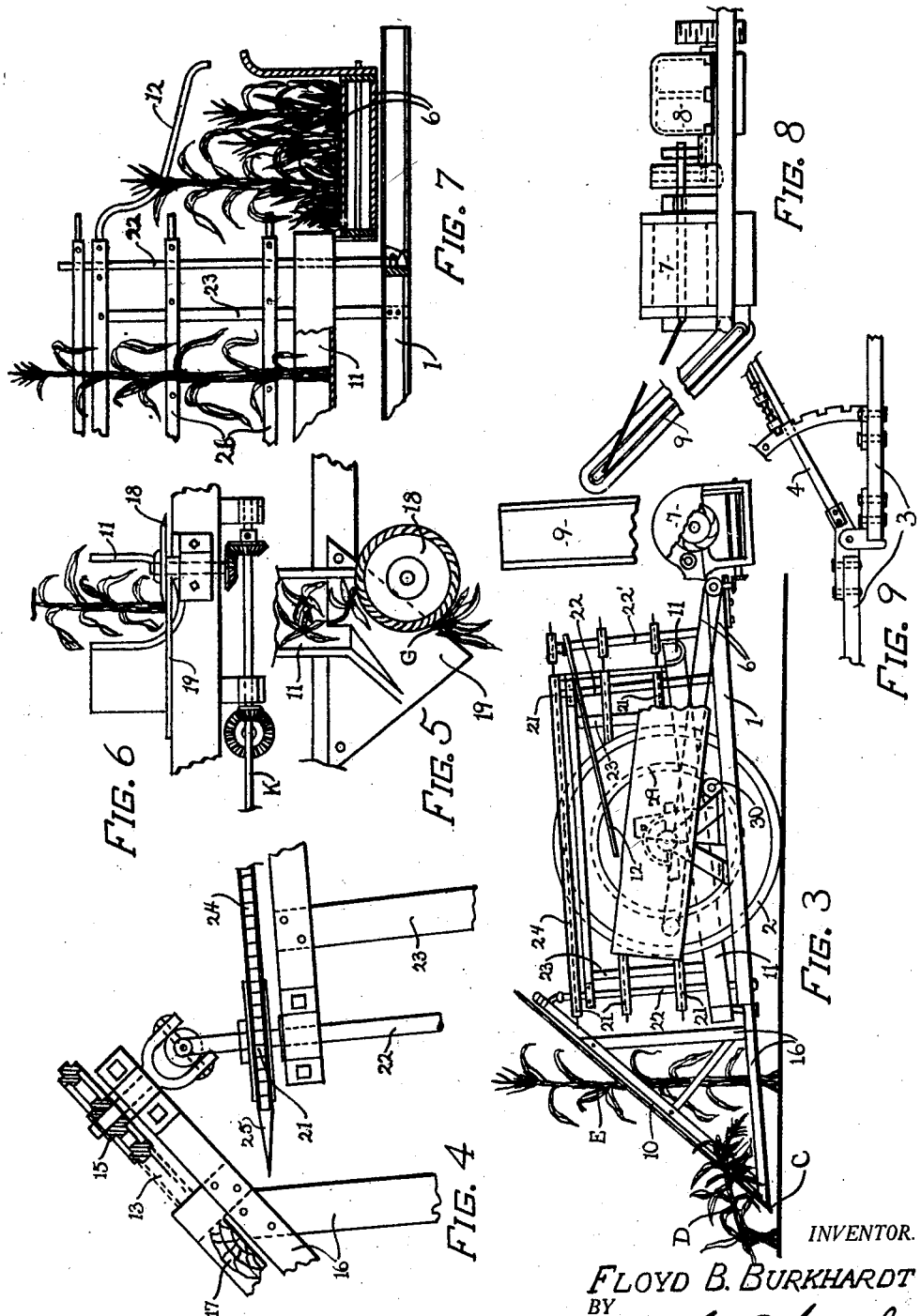

Patented Jan. 22, 1929.

1,699,520

UNITED STATES PATENT OFFICE.

FLOYD B. BURKHARDT, OF TOPEKA, KANSAS.

ENSILAGE MACHINE.

Application filed July 6, 1925. Serial No. 41,742.

My invention relates to an ensilage machine, and has for its chief object the combination of a harvesting and cutting or grinding device.

Another object of my invention is to provide a machine that will operate as one unit, cutting and delivering to the grinder, corn, milo maize, cane, kafir corn, or the like and deliver same into a barge or other receptacle as conveying means to the silo.

A still further object of my invention is to provide a machine that will collect the stalks that is broken or leaning near the ground and placing it in an erect position so that it will be delivered uniformally on a conveyor to be fed longitudinally and horizontally into a chopping cylinder.

A still further object of my invention is to provide a machine that will harvest the crop and immediately convert it into ensilage ready for the silo, obviating undue shrinkage and waste.

A still further object of my invention is to provide a machine having independent actuating means, one for the harvester and one for the ensilage cutting and its conveying means.

In referring to the vegetation hereinafter which is converted into ensilage, the term fodder will be used.

Referring to the drawings, like figures will refer to like parts throughout the different views.

Fig. 1 is a top view of the machine.

Fig. 2 is a view of the transverse travel of the corn, looking in the direction of the arrows A.

Fig. 3 is a side view on which the ensilage chopping device is stationed.

Fig. 4 is a detail view of the universal joint as power transmitting means to the collectors.

Fig. 5 is a plan view of the cutter.

Fig. 6 is an elevation of Fig. 5.

Fig. 7 is a view of the trough and the termination of the horizontal conveyor and a sectional view of the conveyor for the ensilage chopping cylinder.

Fig. 8 is a rear view of the ensilage chopper and the engine.

Fig. 9 is a side view of the tilting device for the machine, same being the tongue by which the machine is also pushed.

The Figures 4–5–6–7–8 and 9 are enlarged details for convenience of illustrations.

The machine as set forth in the drawings and hereinafter described consists of a frame 1 being mounted on drive wheels 2, the said wheels being the power transmitting means for actuating the collectors, cutters and the adjacent conveyors. The said machine being conveyed across the field by horses hitched to a tongue 3 at the rear thereof, said tongue is provided with a foot board on which the driver will stand to guide and adjust the tilt of the machine by means of a lever 4, as shown in Fig. 9, the said foot board and outer end of the tongue is not shown on the drawings. Positioned along one side and a portion of the rear is an extension of the frame B adapted to support a conveyor 6, ensilage chopper 7, engine 8, and an adjustable conveyor 9, for the ensilage to a barge, (the barge not being shown) the said conveyors and chopper are actuated by an internal fuel combustion engine.

The said conveyors 6 and 9 are preferably made of canvas and may be provided with cross bars as means to prevent the fodder and ensilage from sliding therein.

On the frame 1 is mounted at an angle a gathering device 10 being so positioned that the lower ends as at C will engage near the ground to gather stalks of the fodder that is leaning over or broken down as shown at D and as the machine advances the stock of fodder will be straightened to a vertical position as shown at E which is preparatory to being cut and conveyed along the troughs 11 in a vertical position until it has reached the outlet as at F dropping the stock of fodder on the conveyor 6, the said conveyor traveling in the direction indicated by the arrow and the guard arm 12 is further means to cause the stock to position themselves longitudinally with the conveyor, from thence it is fed through the chopping cylinder and from the housing beneath said cylinder it is conveyed to a barge or other means of transportation to the silo.

The last said conveyor and chopping cylinders are driven by the engine heretofore described, all working independent of the driving mechanism for the collectors and the conveying means for the vertical position of the fodder.

I have now described fully the process for collecting and conveying to the ensilage chopper and also the chopping process.

I will now fully describe the mechanical devices shown and required to make the machine an operative device.

The collectors comprise chains 13 having hooks 14 thereon, said chains engaging on sprockets 15 positioned as shown, and the said chain and sprockets are supported by a frame 16 which is rigidly connected to frame 1.

In the loop of the chain is a filler 17 forming a backing for the chain so that it will not yield when contacting the stocks and timed that they will collect the fodder drawing it to an erect position for the cutting and vertically conveying to the ensilage chopper.

The cutting edge of the disc cutter 18 is adjusted to slide in its revolutions on a V-shaped plate 19, said plate functioning as a resistance for the cutter when severing the stocks of fodder as shown at G, in Fig. 5, and the position of which is in vertical alignment with the center of the space between the chains or both of the collectors.

The troughs 11 are centrally positioned in alignment with the cutting points as heretofore described and extending therefrom rearwardly and connecting with a trough transversely positioned to first said troughs, the said troughs are adapted to receive and act as a support for the fodder vertically positioned therein as it is conveyed to the chopping conveyor 6.

The sprockets 21 are carried by shafts 22 which are rotably mounted on frame 1 and vertically supported by an upright frame 23.

In mesh with said sprockets are chains 24, said chains having hooks 25 distributed at equal intervals longitudinally thereon and extending outward across the vertical alignment of the troughs 11.

The said hooks are adapted to engage the fodder as it leaves the cutter, sliding it along in a vertical position as shown in Figures 2–6 and 7 and the bars 26 are so positioned that the fodder will slide freely thereon and hold in position between the hook. The standards 27 are rigidly connected to frame 1, and are means for supporting bars 26.

The chain 24 is supported in alignment by means of idler sprockets 28 so that the pressure of the fodder will not separate the hooks from the said bars 27 in their travel.

The drive wheels 2 have internal gears 29 engaging with pinions 30, the said pinions being rigidly connected to shafts 31 which lead to a differential gearing in housing 32, from whence the power is transmitted as follows.

Shaft H transmits power to sprocket 21 and from thence through the chain 24 to the shaft 22, said shaft extending above the sprocket as shown in Fig. 4 and having thereon a universal joint 33 and shaft transmitting power to the outside collector.

Shaft I is power transmitting means to the corner shaft 22' and from thence by means of the chains 24' to the shaft 22' and a similar universal joint as above described transmitting power to the outside collector.

The inside collector and the cutter are actuated by shaft J in Fig. 1 and shaft K in Fig. 6, all being equally timed for the collectors and geared to a high speed for the disc cutter.

The ensilage chopper and conveyor are driven by an engine transmitting power through shaft L and gears M.

Such modifications may be employed as lies within the scope of the appended claims, and having thus described my invention, what I claim as new and desire to secure by Letters Patent is:—

1. In an ensilage machine, a frame carried by a pair of master wheels, two troughs extending from the front rearward and carried by the frame, gathering mechanisms carried by the frame and positioned in alignment and spaced from the front end of the troughs, rotary disc cutters positioned between the forward end of the troughs and the gatherers as severing means for the stalks, a trough transversely positioned to the first said troughs and positioned on the rear of the frame so that the first said troughs will communicate therewith, a plurality of horizontally positioned conveyors running parallel to each of first said troughs, a similar set of conveyors positioned parallel the second said trough, all of said conveyors adapted to work in conjunction with each other conveying the stalks of corn or the like vertically with the lower ends resting in and sliding along said troughs, an ensilage conveyor carried by the frame and transversely positioned to the last said conveyor as means for delivering the stalks into a cutting machine, motive power for pushing the said frame as carried by the master wheels, the master wheels functioning as power transmitting means for the gatherers, the cutters and the conveyors adjacent the troughs, all as, and for the purpose described.

2. In an ensilage machine, a machine of the kind described, a frame having a plurality of disc cutters horizontally positioned and gatherers forwardly positioned and in alignment with the cutters, a plurality of troughs extending rearward from the cutters, and vertically positioned shafts spaced along the sides of the troughs, said shafts having spaced thereon a plurality of sprocket wheels, and chains having hooks thereon to engage with the sprockets as horizontal conveying means therefor to carry the stalks of fodder rearwardly in a vertical position, a second trough and like conveying means transversely positioned to first said troughs and conveyors to receive the stalks of fodder and conveying in like position to one side of the frame and discharging therefrom, master wheels to carry the frame and to function as power actuating means for the conveyors, cutters and gatherers, a conveyor belt and an ensilage cutter carried by the frame, the belt transversely positioned to the second said conveyor to receive the lower ends of the stalks of fodder as discharging therefrom, a curved arm extending over the conveyor belt and rigidly attached to the frame of the second said conveyor as means for throwing the tops of the stalks in the opposite direction of the travel of the belt to deliver the stalks into the cutter endwise, an engine carried by the frame as motive power for the ensilage and conveyor belt, and a conveyor for the ensilage to a transporting means, all substantially as shown.

FLOYD B. BURKHARDT.